US012486140B2

(12) United States Patent
Munoz Sotoca

(10) Patent No.: US 12,486,140 B2
(45) Date of Patent: Dec. 2, 2025

(54) SAFETY BRAKE TRIGGER

(71) Applicant: Otis Elevator Company, Farmington, CT (US)

(72) Inventor: Javier Munoz Sotoca, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 1415 days.

(21) Appl. No.: 16/951,679

(22) Filed: Nov. 18, 2020

(65) Prior Publication Data

US 2021/0155447 A1 May 27, 2021

(30) Foreign Application Priority Data

Nov. 26, 2019 (EP) .................................... 19383041

(51) Int. Cl.
*B66B 1/34* (2006.01)
*B66B 1/32* (2006.01)

(52) U.S. Cl.
CPC .............. *B66B 1/3446* (2013.01); *B66B 1/32* (2013.01)

(58) Field of Classification Search
CPC ................................ B66B 1/3446; B66B 1/32
USPC .......................................................... 187/390
See application file for complete search history.

(56) References Cited

U.S. PATENT DOCUMENTS 4,304,375 A * 12/1981 Builta ................... B64C 13/503 318/564
5,893,432 A * 4/1999 Nguyen .................... B66B 5/02 187/290
9,873,591 B2 * 1/2018 Kattainen ................. B66B 1/32
10,214,384 B2 * 2/2019 Sonnenmoser ....... B66B 5/0025
10,662,027 B2 * 5/2020 Sonnenmoser ....... B66B 1/3415
12,012,307 B2 * 6/2024 Herkel ..................... B66B 5/027
2006/0201752 A1 * 9/2006 Helstrom ................ B66B 5/027 187/313
2007/0272492 A1 * 11/2007 Tegtmeier ............... B66B 5/027 187/290
2013/0098712 A1 * 4/2013 Svendsen ............. A61G 7/1005 187/390
2014/0202798 A1 * 7/2014 Kattainen ............ B66B 5/0031 187/393
2016/0167921 A1 * 6/2016 Kattainen ................. B66B 1/24 187/289

(Continued)

FOREIGN PATENT DOCUMENTS

CN 110526052 A * 12/2019 ........... B66B 5/0031
CN 210639734 U * 5/2020

(Continued)

OTHER PUBLICATIONS

European Search Report for Application No. 19383041.1; Issued Aug. 28, 2020; 7 Pages.

*Primary Examiner* — Christina M Schreiber
(74) *Attorney, Agent, or Firm* — CANTOR COLBURN LLP

(57) ABSTRACT

An elevator system (1, 1') includes a portable emergency stop switch (2, 2'), arranged to transmit a signal (4) when activated, a signal receiver (6, 6'), arranged to receive the signal (4, 4') transmitted by the portable emergency stop switch (2, 2'); and an elevator safety actuator (8, 8') and an elevator safety brake (10, 10'). In response to receipt of the signal (4, 4'), the signal receiver (6, 6') is arranged to trigger the elevator safety actuator (8, 8') to deploy the elevator safety brake (10, 10').

13 Claims, 3 Drawing Sheets

(56) References Cited

U.S. PATENT DOCUMENTS

| | | | | |
|---|---|---|---|---|
| 2017/0283212 | A1* | 10/2017 | Herkel | B66B 1/32 |
| 2017/0313548 | A1* | 11/2017 | Nakari | B66B 5/027 |
| 2017/0349404 | A1* | 12/2017 | Sonnenmoser | B66B 5/0031 |
| 2017/0355559 | A1* | 12/2017 | Sonnenmoser | B66B 13/22 |
| 2021/0155447 | A1* | 5/2021 | Munoz Sotoca | B66B 5/0068 |
| 2022/0033215 | A1* | 2/2022 | Hollowell | B66B 5/0031 |
| 2022/0106164 | A1* | 4/2022 | Sotoca | B66B 5/22 |

FOREIGN PATENT DOCUMENTS

| | | | | | |
|---|---|---|---|---|---|
| CN | 116137856 | A | * | 5/2023 | B66B 5/02 |
| EP | 3828115 | B1 | * | 8/2024 | B66B 5/025 |
| JP | 2011162275 | A | * | 8/2011 | |

* cited by examiner

SAFETY BRAKE TRIGGER

FOREIGN PRIORITY

This application claims priority to European Patent Application No. 19383041.1, filed Nov. 26, 2019, and all the benefits accruing therefrom under 35 U.S.C. § 119, the contents of which in its entirety are herein incorporated by reference.

TECHNICAL FIELD

This disclosure relates to triggering of elevator safety brakes.

BACKGROUND

It is known in the art to include an electronic safety board in an elevator system. The electronic safety board is arranged to receive sensor data from sensors within the elevator system e.g. speed and acceleration sensor data, to process this received sensor data and trigger safety equipment in response, when necessary.

It is known for elevator system safety equipment to include safety gear, also referred to as "safeties". Safeties are brakes, often wedge shaped, which are arranged to be pushed into contact with an elevator guide rail in order to create friction against the guide rail, and thereby reduce the speed of the elevator car.

It is common for the deployment of the safety gears to be caused by a mechanical stimulus, such as overspeed of the governor sheave resulting in locking of that sheave. However, there are also safeties for which the deployment is controlled by electronic means e.g. by a solenoid.

The present disclosure seeks to provide an elevator system with improved safety.

SUMMARY

According to a first aspect of this disclosure there is provided an elevator system comprising: a portable emergency stop switch, arranged to transmit a signal when activated; a signal receiver, arranged to receive the signal transmitted by the portable emergency stop switch; and an elevator safety actuator and an elevator safety brake, wherein in response to receipt of the signal, the signal receiver is arranged to trigger the elevator safety actuator to deploy the elevator safety brake.

According to a second aspect of the present invention, there is provided an emergency signalling system, comprising: a portable emergency stop switch, arranged to transmit a signal when activated; and a signal receiver, arranged to receive the signal transmitted by the portable emergency stop switch, wherein in response to receipt of the signal, the signal receiver is arranged to output a signal which is suitable for triggering an elevator safety actuator to deploy an elevator safety brake.

According to a third aspect of the present invention, there is provided a method of deploying an elevator safety brake by service personnel, comprising: activating a portable emergency stop switch by the service personnel; transmitting a signal, by the portable emergency stop switch, in response to activation of the portable emergency stop switch; receiving the signal with a signal receiver; and triggering of an elevator safety actuator to deploy the elevator safety brake, in response to the receipt of the signal.

By arranging a portable emergency stop switch to trigger an elevator safety brake, when activated, the present disclosure allows service personnel to activate the safety brake whenever they feel it might be desirable. The portable emergency stop switch allows the safety brake to be triggered by a person who activates the switch, independently of any automatic triggering of safety brake deployment which occurs based on the readings of sensors, that may indicate a dangerous situation.

This is particularly advantageous during construction of an elevator system. At such time the elevator system may not yet be fully functional, or may not be functioning properly. For example, there may be dust in the system that may adversely affect the functioning of certain sensors, or there may be certain components e.g. the guide rails, which have not yet been fully fixed in position. For reasons such as these, accidents are more frequent during this construction phase, for example test runs of the elevator system can sometimes go wrong which can risk injury or other danger, particularly for service personnel working in the elevator hoistway or within the elevator car. It is advantageous that during construction a maintenance person working on the elevator system can use their own judgement, and operate the elevator safety brakes easily using the portable emergency stop switch. For example, a maintenance person may observe that a component e.g. the guide rail, is loose, and may just deploy the elevator safety brake using the portable emergency stop switch, in order to stop the elevator car, and prevent any potential accident. In this case sensors within the elevator system may fail to detect such an issue. In another example, the elevator car may be travelling down the hoistway, not in a freefall (which would be detected and stopped by other elevator systems) but at or above the contract speed (contract speed being the speed at which the elevator car is intended or supposed to travel during normal operation). In this instance, the elevator system may not detect any immediate danger, and thus may not automatically deploy the safety brake, but nonetheless a maintenance person working on the elevator system may feel unsafe. The portable emergency stop switch according to the present disclosure allows the maintenance person in such a situation to choose to deploy the elevator safety brake. This increases safety for the maintenance person.

According to the present disclosure the portable emergency stop switch is arranged to transmit a signal when "activated". It will be understood by the skilled person that the term "activate" covers any mechanism by which a maintenance person may create an input to the portable emergency stop switch in order to indicate their wish to deploy the safety brake.

Optionally the portable emergency stop switch comprises a button. This is particularly advantageous since a button can be easily activated by service personnel and it is unlikely to be activated mistakenly. A button is also simple to implement and is robust in operation (unlikely to fail). The portable emergency stop switch could be any other device which is able to be activated by a maintenance person e.g. an audio sensor, a capacitive touch sensor, an emergency pull cord etc.

Optionally the portable emergency stop switch comprises a housing, and a signal transmitter arranged within the housing, wherein the signal transmitter is arranged to transmit the signal when the portable emergency stop switch is activated. The signal transmitter may be any signal transmitter device, such as an electronic transmitter board, e.g. a printed circuit board with transmitter circuitry thereon.

Optionally the signal is a wireless signal. This advantageously allows the portable emergency stop switch to transmit the signal from any location, so that it can be used anywhere within signal range of the signal receiver, without having to be in wired connection with the signal receiver. Thus service personnel working on the elevator system can carry the portable emergency stop switch with them whilst working, without having to ensure that a wired connection is maintained.

In some examples, the wireless signal is a radio frequency (RF) signal. Protocols such as Bluetooth, WiFi, etc. could be used. However it may be advantageous for the signal to be simply a direct RF signal transmission, e.g. of a particular wavelength, such that it can be detected by a very simple signal receiver, e.g. with analogue electronics. In other examples, the wireless signal could be an ultrasound transmission.

In some examples the portable emergency stop switch is wearable. This advantageously allows an easy way for service personnel to carry the portable emergency stop switch with them as they work on the elevator system, such that it will always be accessible and close to them in the event that they need to activate the portable emergency stop switch to deploy the brakes.

In some examples, the portable emergency stop switch comprises attachment means, allowing service personnel e.g. a maintenance person to attach the portable emergency stop switch to their person, harness or clothing. For example, the portable emergency stop switch may comprise a clip and/or strap and/or harness, and/or any other suitable attachment mechanism. This advantageously provides a maintenance person with a simple mechanism by which to carry the portable emergency stop switch with them as they work, so that it is easily accessible to them at all times, should they need to activate the portable emergency stop switch to deploy the brakes.

In some examples, the portable emergency stop switch is located, in use, in proximity to a maintenance person.

In some examples the system comprises a signalling cable, connecting the portable emergency stop switch to the signal receiver. This signalling cable may be provided in order to facilitate the sending of the signal from the portable emergency stop switch to the signal receiver, as described above. This signalling cable could be provided instead of the signal transmitter described above. Alternatively, the signalling cable could be provided in addition to the signal transmitter. This advantageously provides a redundancy, since the signal can be sent to the signal receiver via both a wired connection i.e. the signalling cable and via a wireless connection i.e. using the signal transmitter. Further alternatively, the elevator system may comprise a first portable emergency stop switch comprising a housing, comprising a signal transmitter arranged within the housing, wherein the signal transmitter is arranged to transmit the signal when the first portable emergency stop switch is activated, and may comprise a second portable emergency stop switch, connected to the signal receiver by the signalling cable. This advantageously provides service personnel with two portable emergency stop switches, one of which signals the signal receiver using a signalling cable, and the other of which uses a signal transmitter. The service personnel may thus choose which of these portable emergency stop switches is most appropriate for use during any given task and may simply use whichever switch is most convenient in order to achieve the same goal. The use of a signal transmitter (optionally together with a signalling cable) is further advantageous in that it can broadcast a signal that can be received by multiple different signal receivers. Thus the single signal transmitter may be used to activate more than one safety system. For example it may activate separate safety actuators and/or it may activate a machine brake elsewhere in the hoistway (e.g. in a machine room).

The signal receiver may also be arranged to shut off a power supply to the elevator system, and/or to shut off power to a machine brake, so as to deploy the machine brake.

The elevator system may further comprise an elevator car, comprising a roof. In this example, the signal receiver may be located on the roof of the elevator car. This may be particularly advantageous in examples in which the portable emergency stop switch is connected to the signal receiver by a signalling cable. In this case the signal receiver is located on the roof of the elevator car, and thus service personnel can easily access the portable emergency stop switch when working on the roof of the elevator car. In some examples the signalling cable is at least 1 m in length, in some examples at least 2 m in length, in some examples at least 5 m in length. This helps to ensure that the length of the signalling cable is sufficient to allow a maintenance person working on the roof of the elevator car to keep the portable emergency stop switch close to them, or even on their person, as they work, without being restricted in their movement by the signalling cable. The length of the signalling cable is preferably also not too long, e.g. less than 10 m in length, in some examples less than 5 m in length, in some examples less than 3 m in length. The choice of length will depend on the size of the elevator car. This helps to prevent the portable emergency stop switch from extending over the roof of the elevator car, since the length of the signalling cable is sufficiently short that the portable emergency stop switch does not reach to the edge of the roof of the elevator car.

The signal receiver may be any signal receiver device, such as an electronic receiver board. For example the signal receiver may be a printed circuit board with receiver circuitry thereon. The receiver circuitry may comprise analogue electronics. The signal receiver may be a wireless signal receiver for receiving a wirelessly transmitted signal.

The signal receiver may be a stand-alone component of the elevator system. Alternatively, the signal receiver may be part of a main safety actuation board of an elevator car, wherein the main safety actuation board is connected to and/or arranged to control other safety equipment of the elevator system. For example, the main safety actuation board may comprise or may be connected to a speed sensor and/or an acceleration sensor. The main safety actuation board may be arranged to deploy the elevator safety brake based on data from the speed sensor and/or the acceleration sensor. The main safety actuation board may contain capacitors arranged to trigger at least one actuator which thereby deploys the elevator safety brake. The main safety actuation board may be manufactured as a single board containing the signal receiver (e.g. in the form of an electronic receiver board). Alternatively, the signal receiver may be a separate component (e.g. a separate electronic receiver board) that is added to an existing safety actuation board of the elevator system i.e. it can be retro-fitted, so as to upgrade a main safety actuation board to operate in accordance with the present disclosure.

In some examples the signal receiver is a first signal receiver, and the system further comprises a second signal receiver arranged to disconnect a power supply to an elevator car and/or to an elevator drive system in response to the receipt of the signal. The power supply may be a mains power supply, or may be a power supply from a separate power source, for example an independent generator or a battery. The second signal receiver may be any signal receiver device, e.g. it may be an electronic receiver board such as a printed circuit board comprising electronic receiver circuitry.

The second signal receiver may be part of the main safety actuation board of the elevator car. Alternatively the second signal receiver may be an add-on as discussed above for upgrading an existing main safety actuation board in a retro-fit procedure.

The second signal receiver may be separate from the elevator car, e.g. located elsewhere in the hoistway such as in a machine room. The second signal receiver may disconnect power to a drive motor and/or a machine brake that brakes the drive motor or a drive sheave. The disconnection of power will normally result in engagement of the machine brake as the design of such brakes is that power is required to hold the brake pad away from its respective braking surface.

In other examples a further signal receiver may be provided for separate actuation of another safety device (e.g. another brake) without necessarily having to cut power. This may be useful for other safety systems that do not automatically activate upon loss of power. The further signal receiver may be any signal receiver device, such as an electronic receiver board as discussed above.

In some examples the signal receiver (e.g. electronic receiver board) comprises at least one capacitor. The at least one capacitor may thus provide energy storage, so that the electronic receiver board is still able to trigger the elevator safety actuator to deploy the elevator safety brake, even in the event of a power failure.

As discussed above, this method of deploying a safety brake may be applied during a construction phase of an elevator or a building. It is during this phase that accidents are most likely due to the amount of work being carried out, the harsh conditions in the environment during that work and the incomplete construction state of the system.

Features of any aspect or example described herein may, wherever appropriate, be applied to any other aspect or example described herein. Where reference is made to different examples or sets of examples, it should be understood that these are not necessarily distinct but may overlap.

BRIEF DESCRIPTION OF THE DRAWINGS

Certain preferred examples of this disclosure will now be described, by way of example only, with reference to the accompanying drawings, in which.

DETAILED DESCRIPTION

Figure 1:
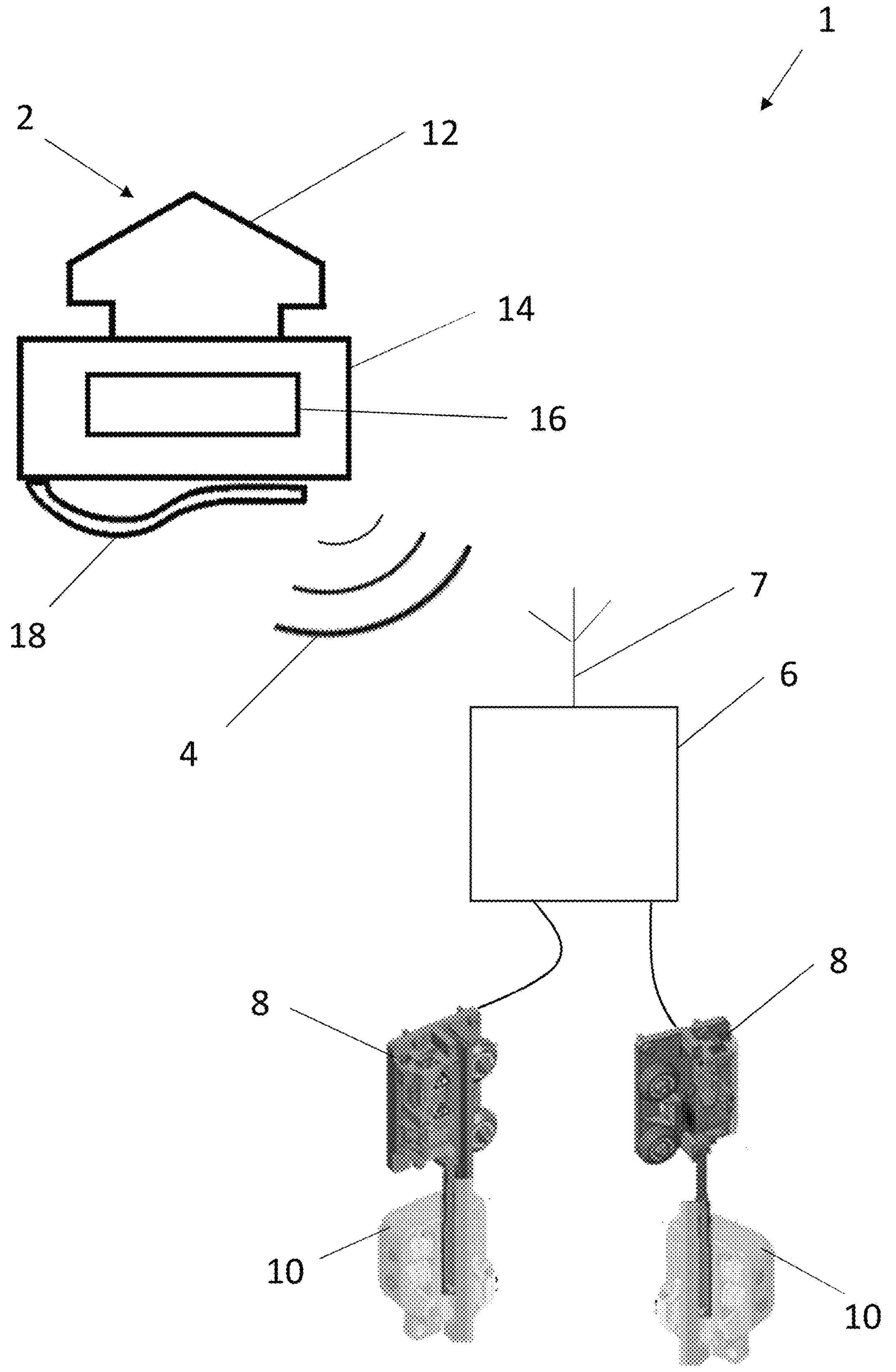
FIG. 1 is a schematic drawing showing a first example of an elevator system according to the present disclosure.

FIG. 1 shows an example of an elevator system 1 according to the present disclosure. The portable emergency stop switch 2 has a housing 14 containing a signal transmitter 16. In this example, the signal transmitter 16 is an electronic transmitter board 16. A maintenance person may choose to press the portable emergency stop switch, for example when they feel uncomfortable about the situation or if they sense any danger, e.g. if they observe a loose component in the elevator system, or if the elevator car travels at a speed which they are not comfortable with. When a maintenance person presses the button 12, this activates the portable emergency stop switch 2. The signal transmitter 16 then transmits a wireless, e.g. radio frequency, signal 4. This signal 4 is received by a signal receiver 6. In the example shown in the Figures, the signal receiver 6 is an electronic circuit board 6. As can be seen, the signal receiver 6 includes an antenna 7, arranged to receive the wireless signal 4. Once the signal receiver 6 receives the signal 4, the signal receiver 6 triggers the safety actuators 8 to deploy the elevator safety brakes 10 (it will be appreciated that while two actuators 8 and two brakes 10 are shown in the figure, a single actuator 8 and brake 10 may be used, or three or more actuators 8 and brakes 10 may be used). Various techniques of deploying elevator safety brakes are known in the art. In some examples, the signal receiver 6 may, on receipt of the signal 4, open a switch that supplies power to the safety actuator 8. The safety actuator 8 may include a solenoid arranged to hold the elevator safety brake 10 in a non-engaging position as long as power is supplied to the solenoid. Thus, when the signal receiver 6 receives the signal 4 and opens the switch which supplies power to the safety actuator 8, the solenoid is dropped and the elevator safety brake 10 is deployed.

The portable emergency stop switch 2 includes attachment means 18, which in this example is a clip. The attachment means 18 allows a maintenance person to affix the portable emergency stop switch 2 onto their clothing or some part of their person or outer attire e.g. to a safety harness that they are wearing. Thus the portable emergency stop switch 2 will move with them and is always within easy reach.

Figure 2:
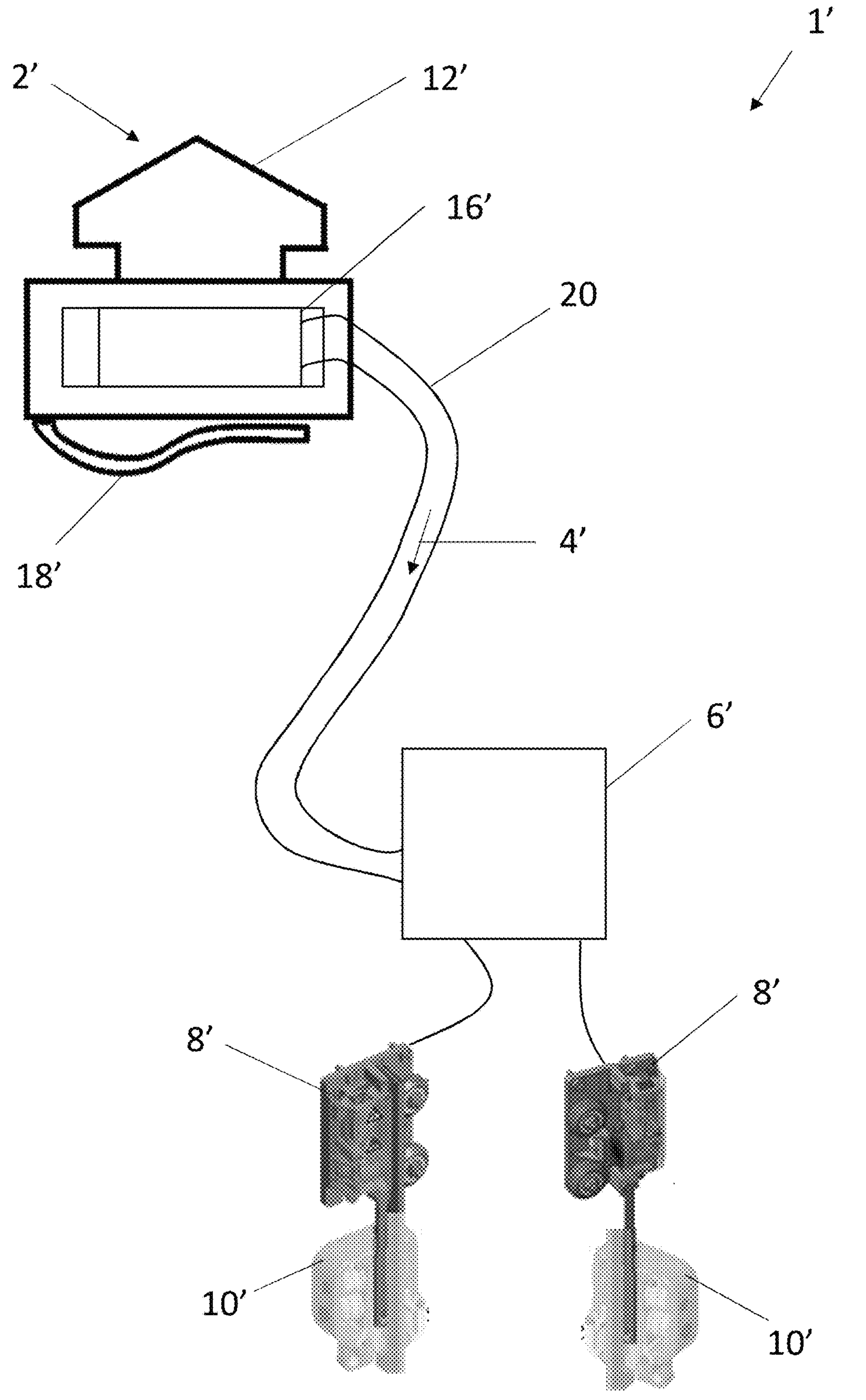
FIG. 2 is a schematic drawing showing a second example of an elevator system according to the present disclosure.

FIG. 2 shows another example of an elevator system 1' according to the present disclosure. The portable emergency stop switch 2' includes button 12'. The portable emergency stop switch 2' may also include attachment means 18', such as a clip, as in the example of FIG. 1, but in this example the attachment means may be different or may be omitted as discussed below. When a maintenance person presses the button 12', this activates the portable emergency stop switch 2'. The portable emergency stop switch 2' is connected to the signal receiver 6' by a signalling cable 20. When a maintenance person presses the button 12', the portable emergency stop switch 2' transmits a signal 4' along the signalling cable 20 to the signal receiver 6'. The portable emergency stop switch 2' includes a signal transmitter 16', connected to the signalling cable 20. This signal transmitter 16' could be a simple switch that makes or breaks a connection so as to generate a signal on the signalling cable 20. Alternatively, the signal transmitter 16' could also be arranged to transmit a wireless signal to the signal receiver 6' as well as the signalling cable 20 being arranged to transmit a signal to the signal receiver 6'. This signal 4' is received by the signal receiver 6'. Once the signal receiver 6' receives the signal 4', the signal receiver 6' triggers the safety actuators 8' to deploy the elevator safety brakes 10'. Various techniques of deploying elevator safety brakes are known in the art. In some examples, the signal receiver 6' may, on receipt of the signal 4', open a switch that supplies power to the (or each) safety actuator 8'. The safety actuator 8' may include a solenoid, arranged to hold the elevator safety brake 10' in a non-engaging position as long as power is supplied to the solenoid. Thus, when the signal receiver 6' receives the signal 4' and opens the switch which supplies power to the safety actuator 8', the solenoid is dropped and the elevator safety brake 10' is deployed. In this example, as the button

12' is on the end of a signalling cable 20, it may be preferred not to attach the button 12' to the clothing or harness of the maintenance personnel. Therefore, the attachment means 18' may be omitted or it may take a different form, e.g. for temporary attachment to other structures. For example a magnetic attachment could be used to keep the button 12' close to the working area, but still allowing it to be moved when the working area changes so that the button 12' is always conveniently located. It will of course be appreciated that such magnetic (or other) attachments may also be used for wireless buttons discussed in relation to FIG. 1.

Figure 3:
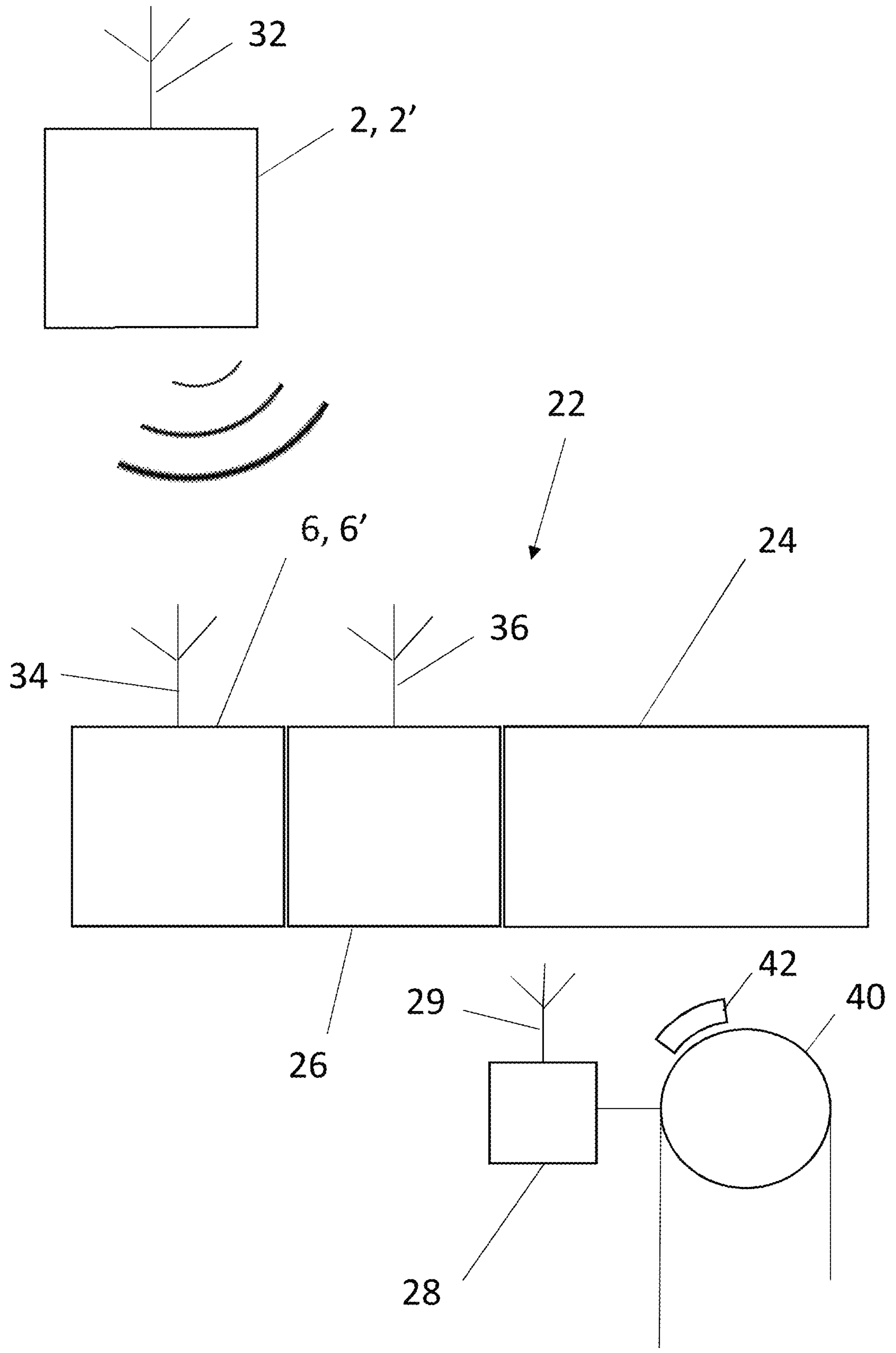
FIG. 3 is a schematic drawing showing a portable emergency stop switch, a first signal receiver and a second signal receiver, according to the present disclosure.

FIG. 3 shows a possible arrangement of the signal receiver 6, 6' and a second signal receiver 26, according to the present disclosure. Although the portable emergency stop switch 2, 2' in FIG. 3 is shown as having an antenna 32, and likewise the first signal receiver 6, 6' has antenna 34 and the second signal receiver 26 has antenna 36, it will be understood by the skilled person that any or all of the signals described between these antennae may alternatively be transmitted by means of a signalling cable, as described in the present disclosure.

The elevator system includes a known safety actuation board 24, as is known in the art. The safety actuation board 24 is connected to a speed sensor and an acceleration sensor (not shown) and is arranged to trigger at least one actuator to deploy the elevator safety brake, based on the readings of at least one of these sensors e.g. when the detected speed or acceleration exceeds a given threshold. The safety actuation board 24 has been altered, according to the present invention, to further include a first signal receiver 6, 6' (e.g. a first electronic receiver board) and a second signal receiver 26 (e.g. a second electronic receiver board). This provides a main safety actuation board 22 according to the present disclosure.

The second signal receiver 26 is arranged to control a power supply to the safety actuation board 24. Alternatively, or additionally, a third signal receiver 28 with antenna 29 may be arranged to control the power supply to the elevator drive system 40 and/or machine brake 42 of the elevator system.

If the second signal receiver 26 or the main safety actuation board 22 is located on the elevator car, the second signal receiver 26 may be arranged to cut the power supply to any or all of the other electronic components which are controlled from the elevator car.

In an alternative, not shown in FIG. 3, the first signal receiver 6, 6' and or the second signal receiver 26 may not be part of the main safety actuation board 22 but may be standalone components that communicate with the safety actuation board 24.

It will be appreciated by those skilled in the art that the invention has been illustrated by describing one or more specific embodiments thereof, but is not limited to these embodiments; many variations and modifications are possible, within the scope of the accompanying claims.

What is claimed is:

1. An elevator system (1, 1') comprising:

a portable emergency stop switch (2, 2'), arranged to transmit a signal (4) when activated;

a first signal receiver (6, 6'), arranged to receive the signal (4, 4') transmitted by the portable emergency stop switch (2, 2');

an elevator safety actuator (8, 8') and an elevator safety brake (10, 10'), wherein in response to receipt of the signal (4, 4'), the first signal receiver (6, 6') is arranged to trigger the elevator safety actuator (8, 8') to deploy the elevator safety brake (10, 10'); and a second signal receiver (26) arranged to disconnect a power supply to an elevator car and/or to an elevator drive system in response to the receipt of the signal (4, 4').

2. An elevator system (1, 1') as claimed in claim 1, wherein the portable emergency stop switch (2, 2') comprises a button (12, 12').

3. An elevator system (1) as claimed in claim 1 wherein the portable emergency stop switch (2, 2') comprises a housing (14), and a signal transmitter (16, 16') arranged within the housing (14), wherein the signal transmitter (16) is arranged to transmit the signal (4, 4') when the portable emergency stop switch (2, 2') is activated.

4. An elevator system (1) as claimed in claim 1, wherein the signal (4) is a wireless signal.

5. An elevator system (1, 1') as claimed in claim 1, wherein the portable emergency stop switch (2, 2') is wearable.

6. An elevator system (1, 1') as claimed in claim 1, wherein the portable emergency stop switch (2, 2') comprises attachment means (18, 18'), allowing a maintenance person to attach the portable emergency stop switch (2, 2') to their person or clothing or harness.

7. An elevator system (1') as claimed in claim 1, wherein the system further comprises a signalling cable (20), connecting the portable emergency stop switch (2') to the signal receiver (6').

8. An elevator system (1') as claimed in claim 7, further comprising an elevator car, wherein the signal receiver (6') is located on the roof of the elevator car.

9. An elevator system (1') as claimed in claim 8, wherein the signalling cable (20) is at least 1 m in length.

10. An elevator system (1, 1') as claimed in claim 1, wherein the signal receiver (6, 6') is part of a main safety actuation board (22) of an elevator car, wherein the main safety actuation board (22) is arranged to control other safety equipment of the elevator system.

11. An elevator system (1, 1') as claimed in claim 1, wherein the second signal receiver (26) is arranged to disconnect a power supply in a machine room of the elevator system.

12. A method of deploying an elevator safety brake (10, 10') by service personnel, comprising:

activating a portable emergency stop switch (2, 2') by the service personnel;

transmitting a signal (4, 4'), by the portable emergency stop switch (2, 2'), in response to activation of the portable emergency stop switch (2, 2');

receiving the signal (4, 4') with a first signal receiver (6, 6') and a second signal receiver (26);

triggering of an elevator safety actuator (8, 8') to deploy the elevator safety brake (10, 10'), in response to the receipt of the signal (4, 4') by the first signal receiver (6, 6'); and disconnecting a power supply to an elevator car and/or to an elevator drive system, in response to receipt of the signal (4, 4') by the second signal receiver (26).

13. A method as claimed in claim 12, wherein the safety brake (10, 10') is deployed during a construction phase of the elevator system.

* * * * *